April 18, 1933.                H. A. HAYDEN                1,903,863
                            CONNECTING ROD END
                            Filed Aug. 12, 1930

INVENTOR.
Howard A. Hayden
BY
Francis O. Hardesty
ATTORNEY.

Patented Apr. 18, 1933

1,903,863

UNITED STATES PATENT OFFICE

HOWARD A. HAYDEN, OF DETROIT, MICHIGAN

CONNECTING ROD END

Application filed August 12, 1930. Serial No. 474,862.

This invention relates to articles of manufacture and more particularly to articles used in the automotive industry and known as "rod ends".

It has been the practice to manufacture rod ends, each of which comprises a U shaped member having a threaded portion in its bight, by a process including the steps of (a) drop forging the U shaped member and (b) threading the bight portion. This practice has been expensive, for many reasons, and an object of this invention is a rod end which can be made by a comparatively inexpensive process.

A further object is a rod end comprising a U shaped stamping having a nut secured thereto adjacent the bight portion and between the legs thereof, the nut preferably being clinched in the bight and adjacent the bottom.

A still further object is a rod end whose bearing portions are so strengthened by means of extruded bosses, etc. that comparatively thin stock may be used, instead of the heavy stock heretofore considered necessary.

A still further object is a novel process for making rod ends, one that substitutes a stamping operation for a forging operation, and one which eliminates the necessity of threading any portion of the rod end.

A still further object is a two-part rod end, the parts being joined to each other.

Still further objects will readily occur to those skilled in the art upon reference to the following description and the accompanying drawing in which Fig. 1 shows a rod end of the invention.

Figure 1:
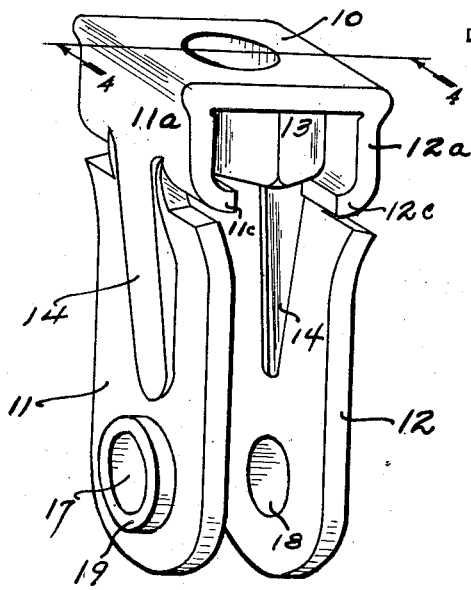

Referring to Fig. 1, the device includes a U shaped body member of strap or sheet metal and having a bight portion 10, legs 11 and 12, and a nut 13, the latter being disposed within the legs 11 and 12 and adjacent the bight portion 10. Further, deformed ribs or grooves 14 may be provided, if desired, for strengthening and rigidifying purposes, side walls of the nut 13 being disposed within the grooves so formed, if desired. The threaded aperture 15 of the nut 13 is aligned with the aperture 16 in the bight portion, and the side walls of the nut are engaged by portions 11a and 12a of the legs 11 and 12, respectively. These last mentioned portions may be in alignment with the major portions of legs 11 and 12, or they may be so disposed as to provide nut supporting shoulders.

Furthermore, if desired, portions 11a and 12a may be provided with struck out portions such as those marked 11c and 12c, to engage additional portions of the nut 13, though it is to be understood that the invention need not be limited to such a construction.

Apertures 17 and 18 may be provided in the legs 11 and 12 to receive a pin on a connecting means for the rod end, and it will be observed that bosses or extrusions 19 are provided around the apertures 17, 18, to form a strengthened bearing area for the pin (not shown).

Figure 5:
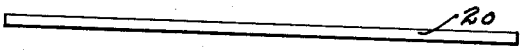
Figs. 5, 6 and 7, show steps in the manufacture of the device, Fig. 7 showing a completed article, mounted for use.
Figure 6:
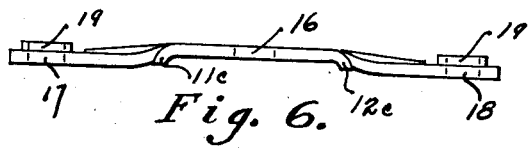
Figures 7, 8:
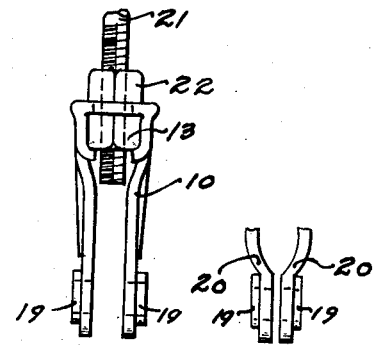
Fig. 8 shows a detail of a modification.
Figure 2:
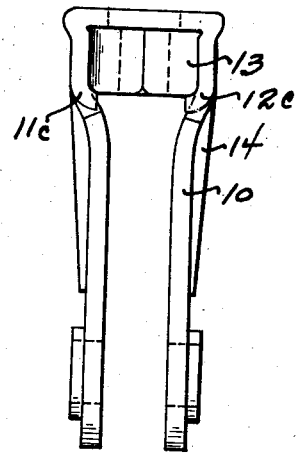
Figs. 2 and 3 are side and end views thereof respectively.
Figure 3:
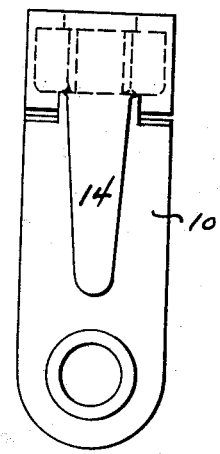
Figure 4:
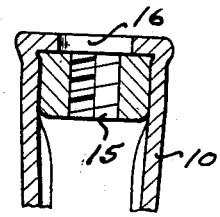
Fig. 4 is a partial section view, as if on line 4—4 of Fig. 1.

The rod end disclosed may be made by a process such as that disclosed in Figs. 5-7, if desired, the process being described as follows:

In the modification of Fig. 8, legs 11 and 12 are bent inwardly as at 20, unlike the previously described forms wherein the legs 11 and 12 are substantially, though not necessarily parallel.

Fig. 7 shows the normal use of the device. The rod end, with nut 13 clinched therein, is secured to the rod 21 as a unit, check nut 22 being provided, if desired, to assist in securing the rod end to the rod.

It will then be observed that there has been provided a novel form of rod end, and a novel process for making such an article of manufacture.

Now having described the invention, and the preferred embodiment thereof, it is to be understood that the said invention is to be limited, not to the specific details herein set forth, but only by the scope of the claim which follows:

A rod end comprising a U shaped member having a threaded nut firmly secured thereto and located adjacent the bight portion thereof between the legs of the U, said bight portion having an aperture aligned with the threaded aperture in said nut, said U shaped member having portions of the legs deformed therefrom to grasp and engage the side walls and one face of said nut to firmly secure it in its desired position, and to hold said nut against said bight portion the legs between said deformed portions being ribbed longitudinally.

HOWARD A. HAYDEN.